United States Patent [19]

Lam et al.

[11] Patent Number: 5,032,716
[45] Date of Patent: Jul. 16, 1991

[54] MOTION TRIGGERED DEVICE/TRIGGERED MESSAGE DELIVERY SYSTEM

[75] Inventors: Frank Lam, 1 Linwood Avenue, Scarborough, Ontario, Canada, M1S 1H2; Clarence A. Verge, Hamilton, Canada

[73] Assignees: Frank Lam, Scarborough; Keith Leslie Whitwell, Hamilton, both of Canada

[21] Appl. No.: 405,527

[22] Filed: Sep. 11, 1989

[51] Int. Cl.[5] .................................................. G01V 9/04
[52] U.S. Cl. .................................... 250/221; 250/222.1
[58] Field of Search ............................ 250/221, 222.1; 340/555, 556, 557, 567; 360/12

[56] References Cited

U.S. PATENT DOCUMENTS

| | | |
|---|---|---|
| 3,509,288 | 4/1970 | Leventhal ........................... 250/221 |
| 3,946,224 | 3/1976 | Allera et al. ........................ 250/221 |
| 4,642,454 | 2/1987 | Carlson .............................. 250/221 |
| 4,644,147 | 2/1987 | Züblin ............................... 250/221 |

Primary Examiner—David C. Nelms
Attorney, Agent, or Firm—Henry D. Coleman; R. Neil Sudol

[57] ABSTRACT

Supermarket point of purchase advertising typically consists of advertisements, brochures, coupons and the like disposed on shelving units. To attract prospective purchasers to such advertising and to constitute point of purchase advertising itself, there is disclosed a shelf-edge mounted device which senses an approaching shopper and then delivers an audio message. The device has an optical sensor which is pointed underneath a shelf and towards the interior of the shelving unit, and detects the shadow of the approaching shopper cast on the back of the shelving unit. A background plate in the field of view of the sensor improves its sensitivity.

20 Claims, 5 Drawing Sheets

MOTION TRIGGERED DEVICE/TRIGGERED MESSAGE DELIVERY SYSTEM

FIELD OF THE INVENTION

This invention relates to a motion triggered device, particularly one adapted to deliver a point of purchase advertising message to consumers in a supermarket environment.

BACKGROUND OF THE INVENTION

There is a need for an inexpensive, compact and energy-efficient motion triggered audio message delivery system to deliver point of purchase advertising to customers in supermarkets, department stores and the like. Preferably, such point of purchase advertising system would be triggered by a prospective customer as he enters into the near vicinity of the product being advertised. It is advantageous that the color of the clothing of the customer not be relevant.

Motion triggered active light beam systems, utilizing an infrared beam directed onto a photosensitive cell which generates a trigger signal when the beam is interrupted by a person moving therethrough, are known. However, this sort of active light beam system is not well adapted for use as a point of purchase advertising system. To catch a potential customer approaching down the supermarket aisle from either direction, two light generating sources must be aligned with two corresponding photosensitive cells located at oblique angles across the aisle. U.S. Pat. No. 4,670,798 to Campbell et al. discloses an active point of purchase advertising system, comprising an ultrasonic sending transducer and an ultrasonic receiving transducer, and a conventional type playback unit, but such type of systems tend to be expensive and power-hungry. U.S. Pat. No. 3,509,288, to Leventhal discloses a passive message delivery system which is triggered by changes in ambient light. However, this system has certain drawbacks. It requires circuitry responsive both to increases in ambient light levels caused by customers wearing relatively bright, light reflecting clothes and decreases in ambient light levels caused by customers wearing relatively dark clothes. Furthermore, it will only detect the presence of a customer who is directly in front of its light sensing device, i.e. it will not detect a customer who is only approaching but not yet in front. Furthermore, this system consumes a lot of power because it uses a conventional electro-mechanic tape playback unit, and requires batteries to be replaced or recharged on a frequent basis.

SUMMARY OF THE INVENTION

The above disadvantages of known prior art point of purchase advertising systems are addressed by the present invention which provides a point of purchase audio message delivery device for mounting on a product display shelving unit, comprising light sensing means for sensing a decrease in the intensity of the ambient light reflected from the interior of the shelving unit, caused by shadows being cast thereon by people moving into the near vicinity of the shelving unit. The light sensing means preferably comprises a photosensor adapted to be mounted onto the shelving unit in such a fashion that the photosensitive surface thereof is directed towards the back wall of the shelving unit for detecting light reflected therefrom. The subject audio message delivery device also comprises signal conditioning means, data storage means, data processing means and audio message generating means. The signal conditioning means includes means for filtering out extraneous components of the signal generated by the sensing means, amplifying means for amplifying the portion of said signal of interest, and comparing means for generating a trigger signal if the amplitude of the filtered end amplified light sensing signal exceeds a preselected referenced value. The data storage means stores encoded audio data signals representative of preselected audio messages. The data processing means is responsive to the trigger signal, and retrieves encoded audio data signals from the storage means, processes such signals, and generates data output signals correlatable with the encoded audio data signals. The audio message generating means converts the output data signal into an audio message.

The message delivery device made in accordance with the present invention is, in its preferred embodiment, a relatively inexpensive, compact, battery-powered unit which draws relatively little current.

The present invention also addresses the difficulties a light sensor typically has in a bright ambient light environment by teaching the concept of creating a sub-environment which is darker than the bright ambient light environment and directing the light sensor towards the sub-environment.

DETAILED DESCRIPTION OF THE PREFERRED EMBODIMENT

Figure 1:
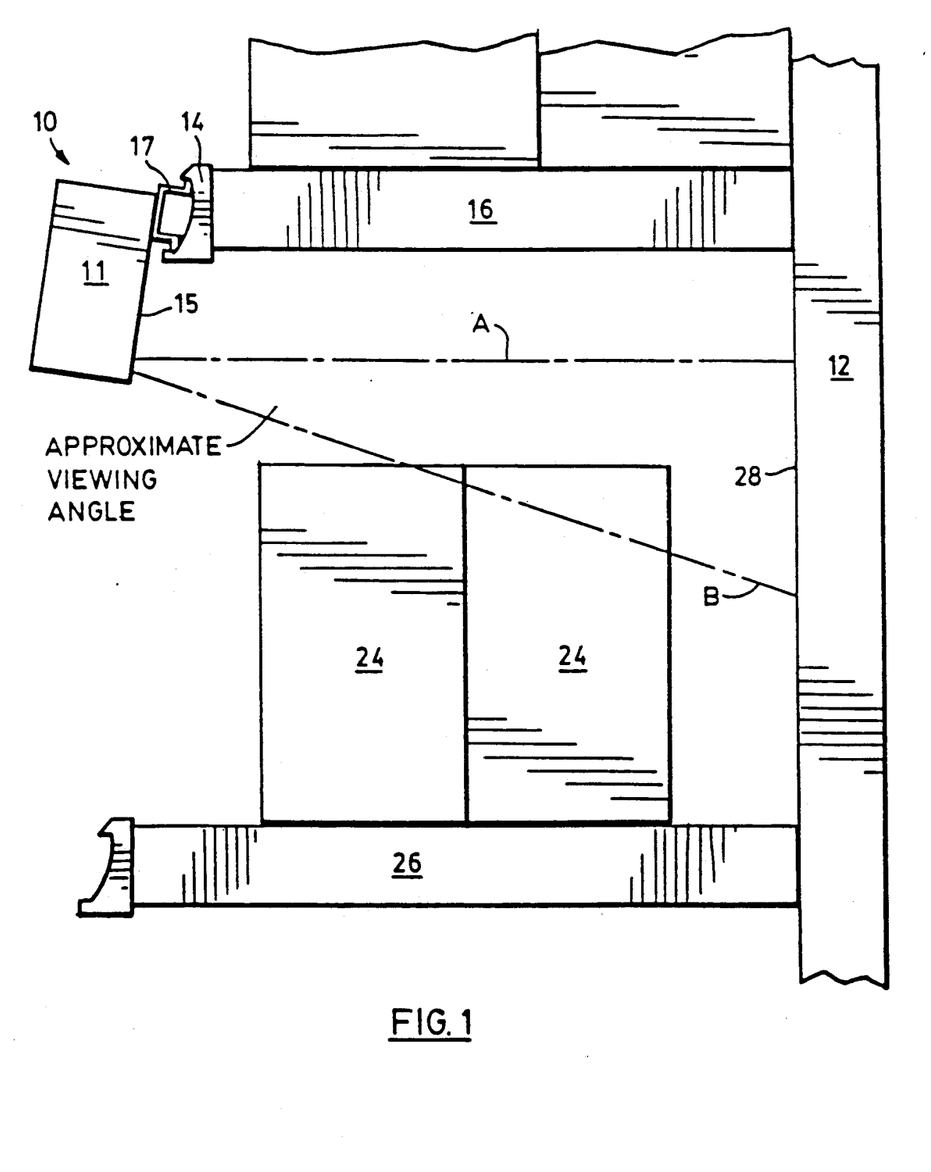
FIG. 1 is a diagrammatic side elevational view of a preferred embodiment of a device made in accordance with the subject invention, shown mounted on a product display shelving unit.
Figure 2:
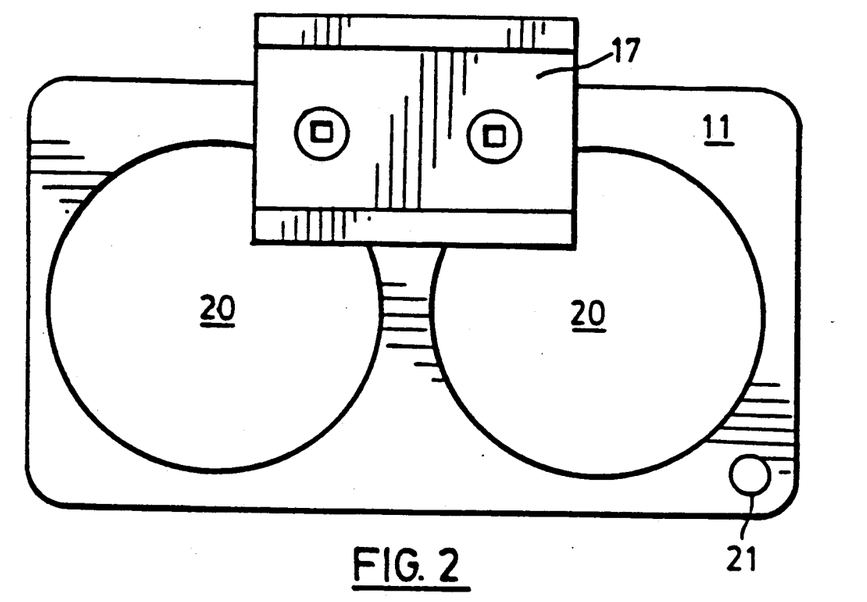
FIG. 2 is a rear elevational view of said device.

Referring first to FIGS. 1 and 2, in a preferred embodiment, the audio message delivery device of the present invention, shown generally as 10, comprises a number of electrical components and associated circuitry contained within a relatively compact housing 11 adapted to be mounted onto shelving unit 12 which is typically found in a supermarket. Housing 11 is preferably mounted onto the front edge 14 of shelf 16 by means of a shelf clamp 17 attached to an upper portion of rear surface 15 of housing 11. Clamp 17 and edge 14 have a conventional interlock relationship, as is commonly found in supermarket shelves. Rear surface 15 is provided with a pair of large apertures for receiving speakers 20 and with a small aperture located at one bottom corner thereof for light sensing means 21. Speakers 20 are advantageously mounted through rear surface 15, instead of the opposed front surface facing the supermarket aisle, to free the front surface for mounting coupons and like promotional materials thereon.

As shown in FIG. 1, device 10 is mounted to a front portion of shelf 16 in such a fashion that the photosensitive surface of light sensing means 21 is directed towards the interior of shelving unit 12, which is typically darker than the ambient light in the aisle shelving unit 12 serves. More particularly, device 10 is clamped to the front of shelf 16 such that the bottom portion of housing 11 containing light sensing means 21 extends below the bottom of shelf 16, but above the top of product 24 stored on next lower shelf 26. When device 10 is attached to shelf 16 in this fashion, light sensing means 21 is directed towards a portion of shelving unit back wall 28 extending between shelf 16 and next lower shelf 26. The approximate field of view of light sensing means 21 is defined by rays A, B. Alternatively, device 10 could be mounted such that light sensing means 21 is directed onto the front of product 24.

Figure 3:
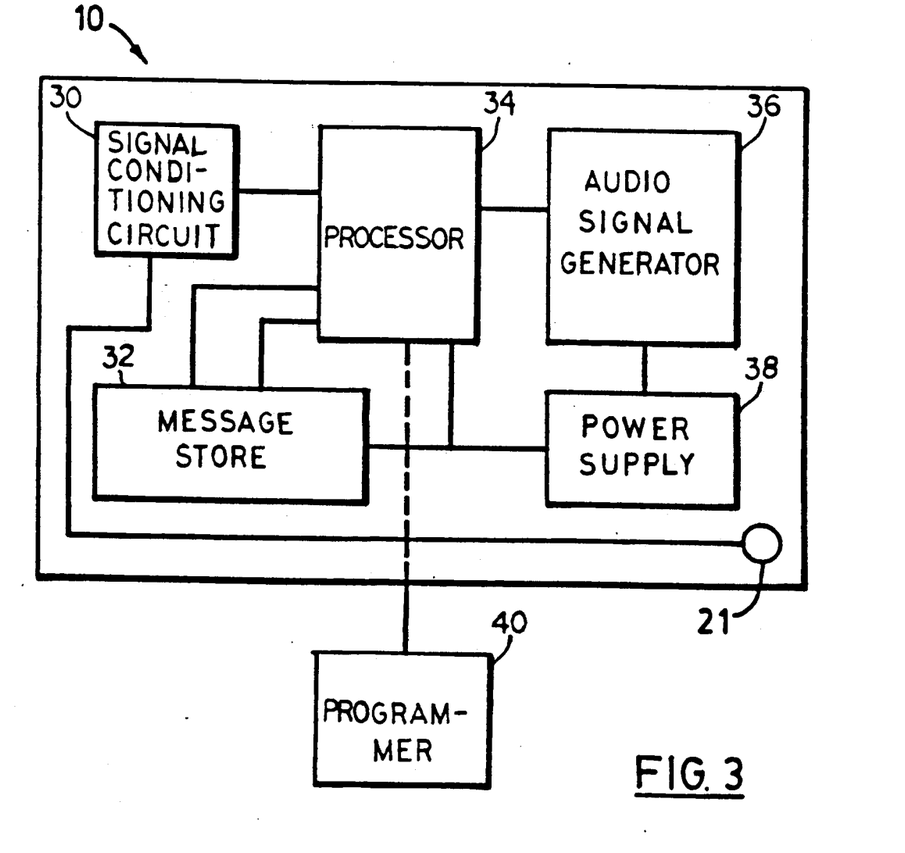
FIG. 3 is a simplified block diagram of the circuitry of the preferred embodiment.

Referring now to FIG. 3, the circuitry of the subject audio message delivery device comprises light sensing means 21 for monitoring the ambient light reflected off the interior of shelving unit 12, signal conditioning means 30 for conditioning the signal received from light sensing means 21, message storage means 32, processing means 34, audio signal generating means 36, and power supply 38. Also shown in FIG. 3 is programming means 40 for programming device 10 with a pre-selected audio message in a manner hereinafter described. Programming means 40 is coupled to device 10 when new audio messages are desired to be programmed.

Signal conditioning means 30 conditions the sensor signal so as to isolate the decreases in the sensor signal caused by shadows cast by customers. This is accomplished in part by filtering out extraneous background and noise signals. In particular, signal conditioning means 30 removes slow variations in the sensor signal due to slowly changing ambient light levels, and the rapid variations caused by flicker in the overhead lighting at power line related frequencies. Signal conditioning means 30 also amplifies a portion of the signal within an appropriate frequency range and compares the amplified filtered signal with a pre-selected reference signal. If the value of the reference signal is exceeded, a trigger signal is generated by signal conditioning means 30.

Storage means 32 stores digital data signals encoded by programming means 40, representative of one or more audio messages designed to promote a particular product. Processing means 34 is a microcomputer which, when the trigger signal is received, retrieves the encoded digital data signals from storage means 32, processes them as described hereinafter, and transmits output data signals to audio signal generating means 36. Audio signal generating means 36 converts the output data signals received from processing means 34 into an audio message which can be received by the person who triggered device 10.

Programming means 40 may comprise a continuously variable slope delta (CVSD) encoder such as a Motorola MC3417, or equivalent, and a computer. An advertising message or other audio message is applied to the input of the encoder. The output of the encoder consists of a series of bits (1 and 0) representing the sign (polarity) of the slope of the signal at instants in time separated by the sampling period. These bits are collected in groups of 8 bits and stored temporarily in a file on a magnetic diskette or other storage device. This file is processed by the computer to remove any and all occurrences of bytes with 8 bits that are either all ones or all zeroes. These patterns are replaced in the file with patterns of 11110111 and 00001000 respectively. This produces no noticeable effect on the audio quality when the data is finally converted back to an audio message, and leaves the patterns of all zeroes and all ones free to be used as markers or flags which may indicate special conditions to processing means 34. One of the special conditions is the end of the message. The computer appends an all zeroes byte to the end of the message.

The computer may also examine the file to check for multiple adjacent bytes containing the same bit pattern. This represents unnecessary duplication of data which may be removed to shorten the file and make space for a longer message. The computer replaces the second occurrence of the data byte with an all ones byte, and replaces the third occurrence with a byte which represents the number of duplications (up to 255).

In the case in which multiple messages are to be loaded into storage means 32, the data files therefor must be assembled by the computer onto a larger file beforehand. During this assembly process, the computer adds a single byte before the data for each message. This byte represents time, in seconds, which elapses after the last message ends before the playback of the next message may begin. The computer also appends an all ones byte at the end of the file containing multiple messages. This signals the end of all messages to processing means 34.

Figure 4:
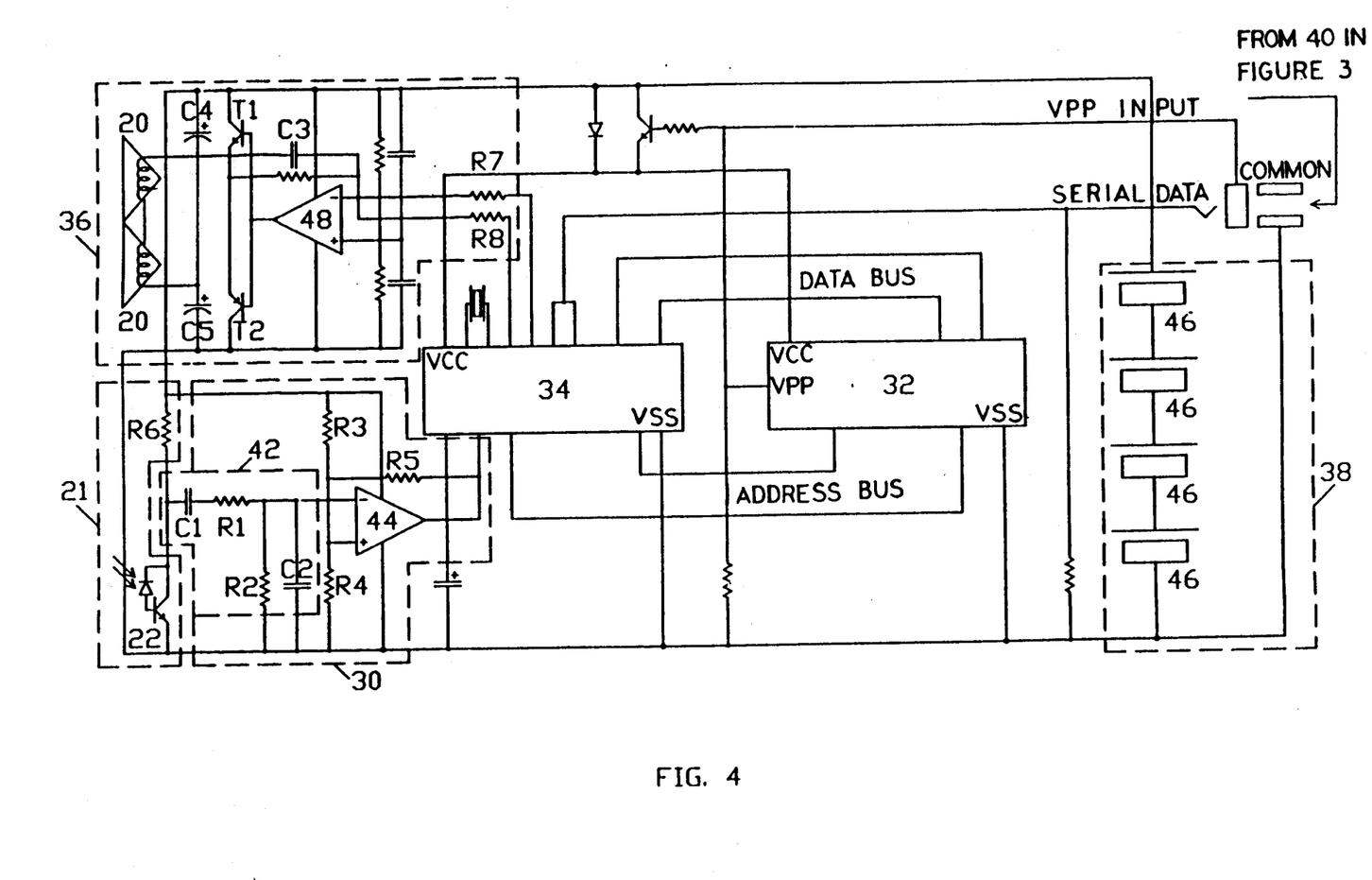
FIG. 4 is a circuit diagram of said device.

Referring now to FIG. 4, light sensing means 21 comprises a photosensor 22 which may be a phototransistor or photodiode-transistor pair such as a Motorola MRD701, and a load resistor R6 in series with photosensor 22. Signal conditioning means 30 includes a capacitor-resistor-capacitor filter network 42 comprising capacitors C1, C2 and resistors R1, R2, and a high impedance differential amplifier 44. The change in voltage drop across load resistor R6 is coupled to differential amplifier 44 through filter network 42. Filter network 42 removes the fixed value of the voltage drop due to the constant light background or any leakage in the photosensor 22, as well as the slow changes in voltage due to slowly changing ambient light levels and rapid variations caused by flicker in the overhead lighting at power line related frequencies. The filtered signal, representing a decrease in ambient light level caused by shadows of people passing by photosensor 22 (in a frequency range from 2 hertz to 20 hertz), is then inputted into the inverting input of differential amplifier 44, and compared to a reference or threshold voltage applied to the non-inverting input of differential amplifier 44 by means of resistors R3, R4 and R5.

This reference voltage sets the minimum voltage change required for triggering and thus the minimum change in shadow density for triggering. The reference voltage must be larger than the maximum expected input offset voltage for differential amplifier 44 to maintain amplifier 44 in an untriggered state. One-half of this reference is derived from the output of differential amplifier 44 as a positive feedback signal through resistor R5, which tends to maintain the amplifier output in whichever state it happens to be in (triggered or untriggered), until such time as the voltage due to changes in lighting exceeds the threshold voltage. The positive feedback then tends to speed the transition to the other state.

In the preferred embodiment, the reference voltage has been selected to be greater than twice the specified maximum input offset for differential amplifier 44, which is a Texas instruments TLC27M2, plus 10% for component variation. This value is 24 millivolts. Since filter network 42 attenuates the sensor signal by a factor of about 2, approximately 50 millivolts of signal is required to change the output of differential amplifier 44 to the triggered state.

It has been found that the intensity of light reflected from the interior of shelving units is relatively low, ranging from about 25 lux to about 75 lux in the case a typical supermarket environment, as compared to light reflected from the floor of a supermarket, which has an intensity in the range from about 250 lux to 325 lux. It is further been found that when consumers move to within a few feet of the device location, such consumers will cast a shadow into the interior of the shelving unit, which decreases the intensity of the light reflected off the back wall of the shelving unit by about 5% to 50%. It has been found that a decrease in light intensity tends to occur when the consumer moves to within three or four feet from the sensor location, regardless of whether the consumer is wearing light or dark clothing.

Accordingly, sensing means 21 and signal conditioning means 30 are optimized for operation at low to moderate light levels in the range of about 10 to about 100 lux. Ambient light conditions establish a photocurrent through photosensor 22 which causes a voltage drop across load resistor R6. In the case of a Motorola MRD701 photo transistor, reflected ambient light of 50 lux intensity produces a photocurrent between 1.6 and 3.2 microamperes. Given a value of 6 volts for power supply 38, the nominal voltage for 4 penlite cells 46 in series, and allowing a maximum drop of 90% of this value at the maximum photocurrent, a maximum value for load resistor R6 is set at 1.65 megohms. Given this value for R6, the required 50 millivolts of sensor signal will be generated if the photocurrent is reduced by 30 nanoamperes. Such a reduction corresponds to a reduction in light illumination of about 1 to 2 lux. Experiments have shown that the minimum amount of light reflected from the interiors of typical supermarket shelving unit caused by shadows of persons walking past the shelving unit within 3 or 4 feet thereon tends to be greater than 2 lux; thus such shadows would be expected to produce a trigger signal.

Signal storage means 32 is preferably an EPROM chip with sufficient capacity to store the encoded message data file. This EPROM chip may be a single one megabit chip such as an Advance Micro Devices part AM27C010 or Hitachi part HN27C101G, which has enough space for digital data which may be converted back into at almost one minute of audio at a sample rate of 19200 bits per second. Expansion of data duplications and or a slightly lower sample rate would extend this beyond one minute.

Processing means 34 is preferably a single chip microcomputer such a Hitachi HD6375V0P or HD6305V0P having 4096 bytes of internal program or data memory available. The primary function of processing means 34 is to read data bytes from sequential locations in storage means 32, process these data bytes as required, and then transmit resultant data bits to audio generating means 36. Processing means 34 also receives from programming means 40 serial data bits representative of an encoded audio message, assembles these bits into bytes, and programs these bytes into sequential storage locations in storage means 32.

Processing means 34 has thirty-one external connections which may be configured to be used as either input or output terminals, plus two additional connections which may serve as inputs only. One of these inputs can function as an interrupt input, and is used in this case as the input from differential amplifier 44. Of the available input output lines, seventeen are used as address lines to storage means 32, eight are use as data input or output lines to or from storage means 32, two are used to turn storage means 32 on or off or place it in programming mode, two are used as serial communication lines to an external computer interface when data is to be programmed into storage means 32, and two are used for output of data to audio generating means 36.

At start up or turn on, the processing means 34 executes a series of instructions which initialize the operating modes of all external connections described above, reads the first data byte from the storage means 32, (the first delay time) and discards it, and then enters a low power consumption mode called STOP.

Only a trigger signal from the conditioning means 30 can cause an exit from this STOP condition. Upon receipt of this trigger or interrupt, the processing means 34 reads the next byte of data and determines how to proceed further upon examination of this and all subsequent bytes. If the byte does not signal some special operating condition, it is retained for future use and the next byte is examined for the same purpose. When two bytes have been examined, the first byte is used as an entry to a translation table where two bits are selected and transmitted to the audio signal generating means 36. The information contained in the two bytes is then rotated one position effectively selecting another data bit for examination.

The translation table provides a means by which the spectrum of the audio output may be modified to remove or enhance selected frequency components. Here, noise present at one half the sampling frequency is cancelled by effectively outputting two bits simultaneously which normally would represent samples separated in time by two sample intervals.

This process of rotation/translation/transmission is repeated at a fixed rate determined to have the same period as the original audio data sampling rate until the eight bits have been transmitted at which time another new byte is retrieved from the storage unit for examination. Rotation/translation/transmission continues until the last byte retrieved signals the end of message.

Upon detection of the end of message flag, the processing means 34 will complete the rotation/translation/transmission of the final byte, read the next byte from the storage means 32 for the delay time required before next trigger is accepted and then return from interrupt to execute the instructions immediately following STOP. However, if the byte read is all ones, it is interpreted as end of all messages and the processing means 34 must first reset the address pointer to zero and then retrieve the delay preceding the FIRST message before returning to the instructions after STOP. At this point WAIT instructions are executed and motion trigger interrupts are discarded until the delay time has expired. Program execution then returns to the STOP position where the next interrupt from the signal conditioning means 30 will start the playback of the next message.

Audio signal generating means 36 comprises a differential integrator consisting of a high input impedance operational amplifier 48 and two transistors T1, T2 which are us to boost the current output capability of operational amplifier 48, as well as a feedback capacitor C3 in which current is integrated over time. Capacitor C3 is made leaky to provide a tendency to reset to zero, and its decay time constant is 1.5 milliseconds, resulting in a low frequency limit of approximately 100 hertz.

The non-inverting input of operational amplifier 48 is biased to one half of the power supply voltage, permitting digital voltage signals of zero and one to appear as signals of equal value, but opposite plurality relative to this biased point. The two digital signals outputted from processing means 34 are inputed into the inverting input of operational amplifier 48, through resistors R7 and R8 of equal value. The sum of the currents through resistors R7 and R8 are integrated in integrating capacitor C3. Since resistors R7 and R8 are of equal value, the current integrated can be zero or positive or negative.

The resulting audio frequency voltage developed at the output of the integrator is connected to a pair of high impedance loud speakers 20 and a split capacitor network made of capacitors C4 and C5, which serve to remove direct current and low frequencies from the speakers circuit while bypassing the power supply. Charges effectively move from capacitor to capacitor to average and thus reduce peak currents taken from the power supply.

In operation, when a prospective customer moves to within a few feet from the subject device mounted on a shelving unit 12 as shown in FIG. 1, a shadow will be cast by the prospective customer onto shelf back wall 28. This shadow causes a decrease in the ambient light level of back wall 28 within the field of view of photosensor 22. As a result, a trigger signal will be generated by signal conditioning means 30, regardless of the colour of the customer's clothing or the location of overhead lighting relative to the customer, provided that the shadow cast by the customer produces a reduction in reflected light intensity on the order of at least two lux. This trigger signal is inputed into processing means 34. Processing means 34 in turn retrieves the encoded audio data signals from storage means 32, processes them as required, and sends data output signals to audio generating means 36. Audio generating means 36 then converts the data output signals from processing means 34 into an audio message which can be heard by the customer.

Figure 5:
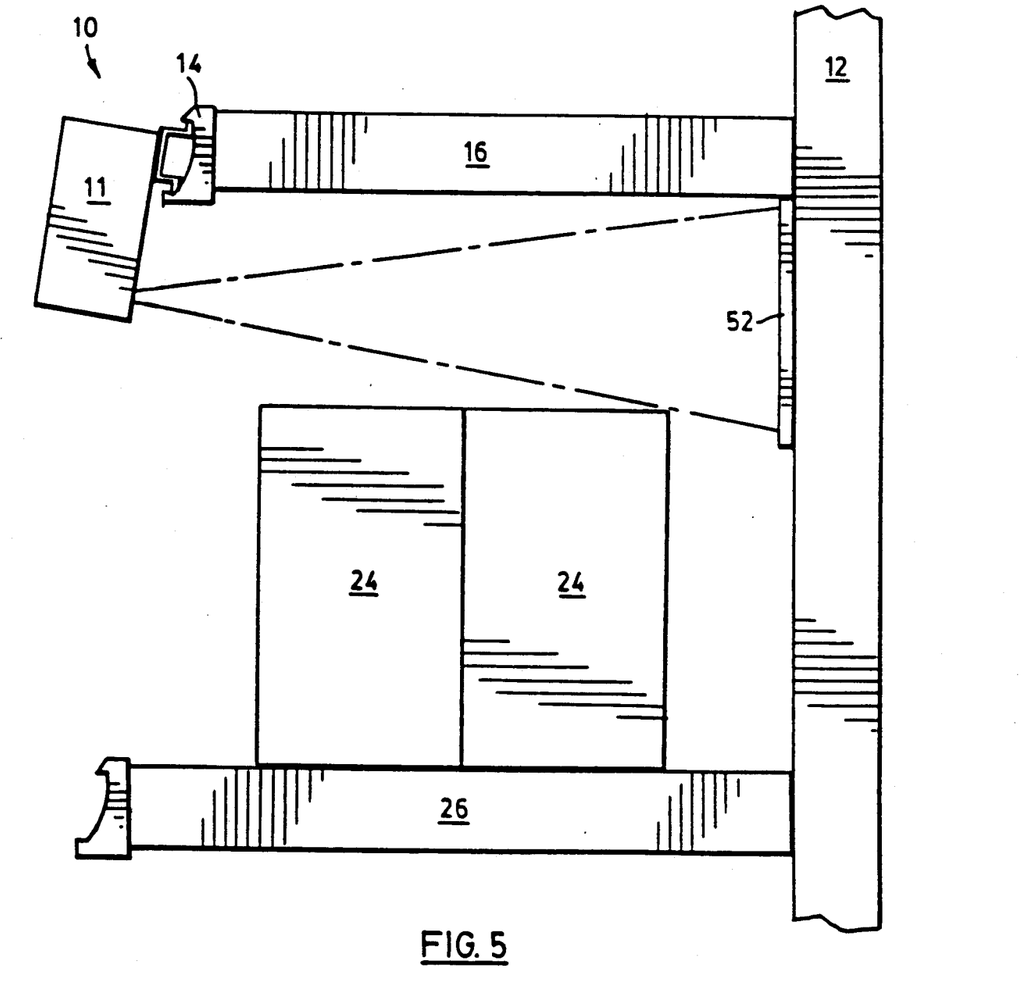
FIG. 5 is a diagrammatic side elevational view of an alternative embodiment of the device shown in FIG. 1.

Referring now to FIG. 5, in an alternative embodiment of the invention, there is provided a background plate 52 adapted to be mounted onto the back wall of shelving unit 12, within the field of view of light sensing means 21, as shown in chain dotted lines. Background plate 52 is preferably a reflective material or has affixed thereto a reflective material, and acts to standardize the environment within the interior of shelving unit 12, since typical shelving units vary greatly in colour and reflective characteristics. A silvery reflective type has been found to be best but the term "reflective" within the context of this invention means any material which does not totally absorb light so that shadows cast thereon may be detected. In this context, plastic and cardboard have also been found to be suitable materials for background plate 52.

Figure 6:
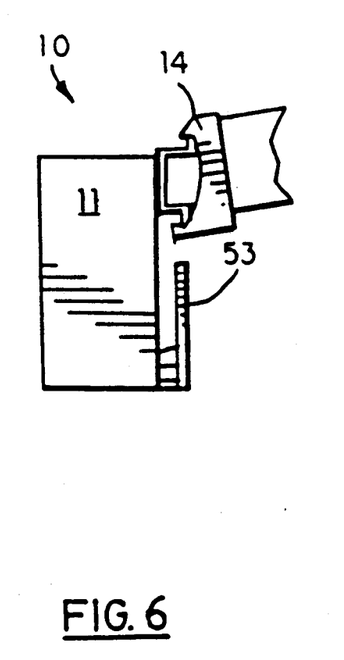
FIG. 6 is a diagrammatic side elevational view of a further embodiment of the device shown in FIG. 5.

A variation of background plate 52 is shown in FIG. 6 as background plate 53. Background plate 53 is made of suitable reflective material, like background plate 52, but is attached to housing 11 close to light sensing means 21, preferably in the order of half inch to several inches and optimally 3.5 inches. The dimensions of background plate 53 should be sufficient to be in the sensing field of view of light sensing means 21. The effect of this configuration of background plate 53 is to create a darker sub-environment for light sensing means 21 to detect shadows. With such a darker sub-environment, device 10 is not restricted to be used in conjunction with a shelf, and may be useful in many other lighting conditions.

Advantageously, background plate 53 may be of dimensions sufficient to reflect or partially reflect the audio signals emitted by speakers 20. It has been found that when background plate 53 reflects the audio signals, the reflected signals are of a superior quality, both in magnitude and quality.

Advantageously, background plate 53 may have a top wall member joining the top of background plate 53 to housing 11 to form a rectangle in side elevational view (not shown). In such a variation, an elongate, tubular sub-environment is created into which light sensing means 21 is directed. Because this sub-environment blocks out light from most directions except the horizontal (that is, except for light entering the open, opposed distal ends of the sub-environment), light sensing means 21 sees a darkened background plate irrespective of a shelf or light source directly overhead. Therefore, for example, device 10 employing this sub environment may be positioned by a stand in the middle of a room lit by arrays of overhead lights but would still be able to detect shadows of a person approaching it towards its open distal ends. It will be apparent that difference geometries of the sub-environment can be easily designed to control the darkness of the sub-environment relative to the ambient light environment and to optimally receive shadows depending on the expected location of target subjects.

Advantageously, light sensing means 21 may be positioned centrally of rear surface 15 or there may be several light sensing means 21 directed towards the interior of the shelf or towards a background plate.

Advantageously, it will be apparent that the person detecting means of device 10 need not be restricted to triggering an audio message delivery system but may be used in other applications, include triggering an alarm in a security area or spraying deodorizing mist into a room.

While the present invention has been described and illustrated with respect to certain preferred and alternative embodiments, those skilled in the art will understand that numerous variations of these embodiments may be made without departing from the present invention, the scope of which is defined in the appended claims.

We claim:

1. A device for mounting on a product display shelving unit, comprising:
    a) light sensing means for sensing the intensity of ambient light reflected from the interior of the shelving unit and for generating an electrical sensor signal correlatable with the ambient light intensity;
    b) signal conditioning means for isolating decreases in the sensor signal caused by shadows being cast into the interior of the shelving unit by people moving into the near vicinity of the light sensing means and for generating a trigger signal when the magnitude of said decreases exceeds a pre-selected value;
    c) storage means for storing encoded audio data signals representative of at least one pre-selected audio message and emitting said message;
    d) processing means responsive to the trigger signal for retrieving from the storage means the encoded audio data signals and for generating data output signals correlatable with the encoded audio data signals; and e) audio message generating means operably coupled to the processing means for converting the data output signals into an audio message and for emitting said message.

2. The device defined in claim 1, wherein the signal conditioning means comprises filtering means for filtering out pre-selected extraneous components of the sensor signal, amplifying means for amplifying a portion of the sensor signal within a pre-selected frequency range, and comparing means for generating a trigger signal if the amplitude of the filtered and amplified signal exceeds a pre-selected reference signal value.

3. The device defined in claim 1, wherein the light sensing means comprises a photosensor contained within a housing adapted to be mounted onto a front portion of the shelving unit in such a fashion that the photosensitive surface of the photosensor is directed towards the back wall of the shelving unit.

4. The device defined in claim 3, wherein all of the components of the device are housed in a single housing adapted to be attached to the outer edge of a shelf of the shelving unit.

5. The device defined in claim 1, wherein the light sensing means and signal conditioning means are tuned to operate in a low to medium light intensity environment below about 100 lux.

6. The device defined in claim 1, wherein the storage means comprises digital data storage means for storing digital encoded audio data signals and the processing means comprises microcomputer data processing means for processing the digital encoded audio data signals from the storage means and for generating digital data output signals.

7. The device defined in claim 6, wherein the audio message generating means comprises means for converting the digital output signals into analog electrical signals and means for generating an audio message from the analog electrical signals.

8. The device as defined in claim 6, wherein the computer data storage means is programmable.

9. The device as defined in claim 8, wherein the computer data storage means is an erasable programmable read only memory chip.

10. The device as defined in claim 3, wherein the photosensor is a device whose resistance changes according to the amount of light it receives.

11. The device as defined in claim 1, wherein the audio message generating means comprises a differential integrator.

12. The device as defined in claim 1, further comprising reflective means for reflecting ambient light adapted to be mounted to the back wall of the shelving unit in the field of view of said light sensing means.

13. The device as defined in claim 1, further comprising:

(a) a housing for housing said light sensing means, and
(b) reflective means for reflecting ambient light conditions attached to said housing in the field of view of said light sensing means.

14. The device as defined in claim 13, wherein said reflective means is attached to said housing about one inch from said light sensing means.

15. The device as defined in claim 13, wherein said audio message generating means comprises a speaker which is directed toward said reflective means.

16. The device as defined in claim 3, further comprising power supply means contained within the housing for supplying power to said light sensing means, storage means, signal processing means and audio message generating means.

17. An audio message delivery device for mounting on a product display shelving unit, comprising:

a) light sensing means for sensing the intensity of ambient light reflected from the interior of the shelving unit and for generating an electrical sensor signal correlatable with said ambient light intensity, wherein the light sensing means comprises a photosensor directed towards the back wall of the shelving unit;

b) signal conditioning means for isolating decreases in the sensor signal caused by shadows being cast onto the back wall of the shelving unit by people moving into the near vicinity of the light sensing means and for generating a trigger signal when the magnitude of said decreases exceeds a pre-selected value;

c) digital data storage means for storing digital encoded audio data signal representative of least one preselected audio message;

d) data processing means responsive to the trigger signal for retrieving from the data storage means and processing the digital encoded audio data signals, and for generating processed digital data output signals correlatable with the digital encoded audio data signals; and e) audio message generating means operably coupled to the data processing means for converting the processed digital data output signals into analog electrical signals, and for generating an audio message correlatable with said analog electrical signals.

18. A device for detecting a change in the ambient light environment, comprising:

a) background means for reflecting ambient light;

b) light sensing means for sensing the intensity of ambient light reflected from said background means and for generating a signal correlatable with said ambient light intensity, wherein said light sensing means comprises a sensor whose primary direction of sensitivity intersects said background means;

c) signal conditioning means for isolating a change in the sensor signal caused by a change in the ambient light reflected by said background means, and for generating a trigger signal when the magnitude of the change exceeds a pre-selected value.

19. A device as defined by claim 18, further comprising housing for said light sensing means, and said background means is attached to said housing so as to form a sub-environment therebetween which is darker than the ambient light environment and said light sensing means is directed into said sub-environment.

20. A device as defined by claim 19, wherein said housing is housing is elongate and said background means is elongate and are attached to each other so as to form a channel-like sub-environment into which said light sensing means is directed.

* * * * *